United States Patent
Compton et al.

(10) Patent No.: US 10,864,483 B2
(45) Date of Patent: Dec. 15, 2020

(54) MOLECULAR WEIGHT FILTRATION SYSTEM AND APPARATUS

(71) Applicant: Integrated Protein Technologies, Inc., Evanston, IL (US)

(72) Inventors: Philip D. Compton, Chicago, IL (US); Jared Drader, San Marcos, CA (US)

(73) Assignee: INTEGRATED PROTEIN TECHNOLOGIES, SNC., Evanston, IL (US)

( * ) Notice: Subject to any disclaimer, the term of this patent is extended or adjusted under 35 U.S.C. 154(b) by 176 days.

(21) Appl. No.: 16/193,539

(22) Filed: Nov. 16, 2018

(65) Prior Publication Data

US 2020/0156009 A1 May 21, 2020

(51) Int. Cl.
*B01D 63/08* (2006.01)
*B01D 69/02* (2006.01)
*G01N 1/40* (2006.01)
*G01N 1/34* (2006.01)

(52) U.S. Cl.
CPC ............. *B01D 63/08* (2013.01); *B01D 69/02* (2013.01); *G01N 1/34* (2013.01); *G01N 1/4005* (2013.01); *B01D 2313/06* (2013.01); *B01D 2313/10* (2013.01); *B01D 2325/34* (2013.01)

(58) Field of Classification Search
CPC ...... B01D 63/08; B01D 69/02; G01N 1/4005; G01N 1/34
See application file for complete search history.

(56) References Cited

U.S. PATENT DOCUMENTS

| | | | |
|---|---|---|---|
| 175,779 | A | 4/1876 | Sweeney |
| 186,824 | A | 7/1877 | Gartenmann |
| 4,678,578 | A | 7/1987 | Nodes |
| 4,765,906 | A | 8/1988 | Downing |
| 5,009,789 | A | 4/1991 | Helmer |
| 5,034,121 | A | 7/1991 | Budin |
| 5,258,122 | A | 11/1993 | Ha |
| 5,512,167 | A | 4/1996 | Gramms |
| 7,297,269 | B2 | 11/2007 | Osenar |
| 7,980,395 | B2 | 7/2011 | Kehl |
| 8,333,891 | B2 | 2/2012 | Wyatt |
| 2002/0173016 | A1 | 11/2002 | Wurst et al. |

(Continued)

FOREIGN PATENT DOCUMENTS

| | | |
|---|---|---|
| JP | 2011208985 | 10/2011 |
| WO | 2000024499 | 5/2000 |
| WO | 2006130815 | 12/2006 |

OTHER PUBLICATIONS

The International Searching Authority, International Search Report, dated Mar. 10, 2020, 4 pages, United States.

(Continued)

*Primary Examiner* — David Z Huang
(74) *Attorney, Agent, or Firm* — Anooj Patel; Kevin Schraven; Hankin Patent Law, APC

(57) ABSTRACT

A molecular filtration device and method of use capable of filtering and purifying molecules of a particular characteristic, wherein the amount of molecule to be filtered may be in the nanogram range and may be dispersed in a relatively large volume of solution. The resultant elution may include a substantially pure solution comprising the desired molecule.

20 Claims, 19 Drawing Sheets

(56) References Cited

U.S. PATENT DOCUMENTS

| | | | | |
|---|---|---|---|---|
| 2004/0219072 | A1* | 11/2004 | Yamakawa | B01L 3/502753 422/400 |
| 2005/0191530 | A1* | 9/2005 | Mossman | B01D 69/02 429/414 |
| 2011/0250585 | A1 | 10/2011 | Ingber et al. | |
| 2016/0003787 | A1* | 1/2016 | Wright | G01N 33/487 250/282 |
| 2018/0104650 | A1* | 4/2018 | Kamito | B01D 63/08 |

OTHER PUBLICATIONS

The International Searching Authority, Written Opinion of the International Searching Authority, dated Mar. 10, 2020, 4 pages, United States.

Sterlitech Corporation, CF042 Crossflow Assembly, clear cast acrylic, online store: https://www.sterlitech.com/cf042-crossflow-cell-cf042ac.html.

Startorius, Vivaflow cassettes https://www.sartorius.com/sartorius/en/EUR/Applications/Laboratory/Sample-Preparation/Ultrafiltration/Vivaflow-200/p/M_Vivaflow_200.

Termofishisher, Pierce Centrifugal Concentrators https://www.thermofisher.com/us/en/home/life-science/protein-biology/protein-purification-isolation/protein-dialysis-desaltingconcentration/protein-concentrators.html.

Wikipedia, Asymmetric flow field flow fractionation (AF4) https://en.wikipedia.org/wiki/Asymmetric_flow_field_flow_fractionation.

* cited by examiner

MOLECULAR WEIGHT FILTRATION SYSTEM AND APPARATUS

FIELD OF USE

This disclosure pertains to a system and apparatus for filtration, purification, and concentration of biological molecules based on the molecules' molecular weight cut-off. More particularly, the system and apparatus may comprise a system for proteomics sample preparation, wherein the sample size is extremely small, even as small as being in the nanogram range, and subsequently directly processed by molecule analytic techniques.

BACKGROUND

Obtaining a sufficiently pure sample of biological molecules such as DNA, RNA, and proteins for purposes of experimentation can be a difficult task but is often a required step to performing a wide array of experiments.

The process generally begins with a scientist performing a synthesis step to generate the molecules desired. The molecules desired may be DNA, RNA, proteins, or other large molecules.

In some embodiments a plasmid containing genetic code to synthesize a specific protein may be inserted into microbial cells. The plasmid may also contain a specific antibiotic resistance, such that any microbial cells that did not receive the plasmid successfully may be eliminated by an antibiotic. A single colony of the microbial cells may then be selected, transferred to a growth medium, and grown until a desired cell density is obtained. Next, an activator molecule may be added to the growth medium to cause the microbial cells to produce the desired protein. The microbial cells, at that stage, will contain within them the specific protein in addition to all the other components of the cells. At that stage, various filtration and purification techniques may be used to isolate the specific protein. Alternatively, samples may be prepared from endogenous material, such as human tissue homogenates or human blood cell lysates.

One filtration and concentration technique, dead end filtration, allows a solution containing the specific protein to be concentrated while simultaneously removing other components of the solution that are smaller than a molecular weight cut off ("MWCO") of a membrane at the end of the dead end filtration device. While this may be an effective technique for concentrating and removing smaller contaminants, this technique may often cause the membrane to become clogged and slow down. Dead end filtration also often accepts only small amount of solution at a time, so the scientist may need to repeatedly refill the dead end filtration device with solution containing the specific protein.

Another filtration and concentration technique, cross flow filtration, allows for the scientist to feed a large amount of solution without needing to stop and refill periodically by continually causing the solution to flow across a membrane, such that solution and contaminants pass through the membrane, while the solution and large molecules do not pass through the membrane. After the solution passes over the membrane, it may be recycled for further purification. Over time, as solution and contaminants pass through the membrane, but the specific protein does not, the concentration of the specific protein increases.

Most existing techniques for purification of molecules are directed towards relatively large sample sizes. Scientists often face difficulty in effectively isolating and purifying molecules at relatively low sample sizes, such as at the nanogram scale. Scientists may need to operate with these extremely small sample sizes for many reasons. Some reasons may be that the sample utilizes a radioactive isotope, the sample may interact with itself, or the sample is difficult to produce at all.

Accordingly, what is needed is a system and apparatus that may more effectively filter, purify, and concentrate a desired biological molecule, especially at low concentrations.

SUMMARY

One embodiment may be molecular filtration device comprising: an upper portion; and a lower portion; wherein the upper portion may comprise two upper ports; wherein the two upper ports comprise a first upper port and a second upper port; wherein the first upper port may be configured to receive a first upper flow device; wherein the second upper port may be configured to receive a second upper flow device; wherein the first upper flow device may be configured to alternate between injecting and not injecting solution; wherein the second upper flow device may be configured to alternate between injecting and withdrawing solution; wherein the lower portion may comprise a lower port and a reservoir; wherein the lower port may be configured to receive a lower flow device; wherein the lower flow device may be configured to alternate between injecting and withdrawing solution from the reservoir; wherein the upper portion may comprise a channel forming lip; wherein a channel forming cavity may be formed by the channel forming lip when the upper portion and the lower portion engage one another; wherein a lower sealing surface of the upper portion and an upper sealing surface of the lower portion may be configured to receive and compress a membrane; wherein the membrane may be configured to extend beyond an outer edge of the channel forming lip, wherein a portion of the membrane that may be located within an inner edge of the channel forming lip may be not compressed; wherein a channel may be defined by the channel forming cavity and the membrane. The membrane may be a filtration membrane or a molecular weight cut off filtration membrane. The upper sealing surface of the lower portion and the lower sealing surface of the upper portion may be configured to apply a pressure to one another through the membrane. The channel may have a volume of between about 5 µL and about 50 µL. The reservoir may comprise a frit supporting lip. The molecular filtration device may further comprise a frit; and wherein the frit supporting lip may be configured to receive the frit. The frit may comprise a porous structure. The frit may be rigid. The molecular filtration device may further comprise an upper rigid support member configured to be received within the channel forming lip in order to provide structural support to an upper surface of the membrane. In one embodiment, the channel forming cavity may be teardrop shaped. Alternatively, the channel forming cavity may be oval shaped. Alternatively, the channel forming cavity may be elongated rectangle shaped. The molecular filtration device of claim 1, wherein the upper portion and the lower portion may matingly engage one another.

Another embodiment may be a method for automated molecular sample analysis comprising the steps; introducing a sample into a molecular purification system; wherein the sample may comprise at least one type of molecule to be isolated; wherein the molecular purification system may comprise a molecular filtration device; wherein the molecular filtration device may comprise an upper portion and a lower portion; wherein the upper portion may comprise two upper ports; wherein the two upper ports comprise a first upper port and a second upper port; wherein the first upper port may be configured to receive a first upper flow device; wherein the second upper port may be configured to receive a second upper flow device; wherein the first upper flow device may be configured to alternate between injecting and not injecting solution; wherein the second upper flow device may be configured to alternate between injecting and withdrawing solution; wherein the lower portion may comprise a lower port and a reservoir; wherein the lower port may be configured to receive a lower flow device; wherein the lower flow device may be configured to alternate between injecting and withdrawing solution from the reservoir; wherein the upper portion may comprise a channel forming lip; wherein a channel forming cavity may be formed by the channel forming lip when the upper portion and the lower portion engage one another; wherein a lower sealing surface of the upper portion and an upper sealing surface of the lower portion may be configured to receive and compress a membrane; wherein the membrane may be configured to extend beyond an outer edge of the channel forming lip, wherein a portion of the membrane that may be located within an inner edge of the channel forming lip may be not compressed; wherein a channel may be defined by the channel forming cavity and the membrane; wherein the sample may be loaded into the molecular filtration device. The method for automated molecular sample analysis may further comprise the step purifying the sample by washing the sample while loaded on the molecular filtration device. The method for automated molecular sample analysis may further comprise the step eluting the sample from the molecular filtration device; wherein the sample may be eluted by preventing flow of the solution through one of the two upper ports and reversing the flow direction of solution through the other upper port and lower port. The method for automated molecular sample analysis may further comprise the step transferring the eluted sample to an analysis machine; wherein the analysis machine may be in fluid communication with the molecular filtration device.

Another embodiment of a molecular filtration device may comprise: an upper portion; and a lower portion; wherein the upper portion may comprise two upper ports; wherein the two upper ports comprise a first upper port and a second upper port; wherein the first upper port may be configured to receive a first upper flow device; wherein the second upper port may be configured to receive a second upper flow device; wherein the first upper flow device may be configured to alternate between injecting and not injecting solution; wherein the second upper flow device may be configured to alternate between injecting and withdrawing solution; wherein the lower portion may comprise a lower port and a reservoir; wherein the lower port may be configured to receive a lower flow device; wherein the lower flow device may be configured to alternate between injecting and withdrawing solution from the reservoir; wherein the upper portion may comprise a channel forming lip; wherein a channel forming cavity may be formed by the channel forming lip when the upper portion and the lower portion matingly engage one another; wherein a lower sealing surface of the upper portion and an upper sealing surface of the lower portion may be configured to receive and compress a membrane; wherein the membrane may be configured to extend beyond an outer edge of the channel forming lip, wherein a portion of the membrane that may be located within an inner edge of the channel forming lip may be not compressed; wherein a channel may be defined by the channel forming cavity and the membrane; wherein the filtration membrane may be a molecular weight cut off filtration membrane; wherein the upper sealing surface of the lower portion and the lower sealing surface of the upper portion may be configured to apply a pressure to one another through the membrane; wherein the channel may have a volume of between about 5 uL and about 50 uL; wherein the reservoir may comprise a frit supporting lip; wherein the device further may comprise a frit; wherein the frit supporting lip may be configured to receive the frit; wherein the frit may comprise a porous structure; and wherein the frit may be rigid.

The apparatus of the present disclosure may be an assembly of components configured to filter and purify molecules having a size greater than a desired MWCO.

The apparatus of the present disclosure may be disassembled, reassembled, and re-used, as long as the MWCO membrane remains structurally sound. If the MWCO membrane becomes compromised, it may be replaced.

The apparatus of the present disclosure may be used to purify molecules of a certain size and allow for buffer to be exchanged at the same time. Furthermore, buffer exchange may be used to do selectively unfold specific protein molecules, or alternatively, fold specific protein molecules. When a native buffer is used, experiments may also be conducted within the apparatus, such as by introducing a reactant to the sample and observing non-covalent molecule-molecule interactions. This may be beneficial due to the low volume of sample in the apparatus itself allowing for experiments to be performed with a relatively low amount of sample.

The apparatus of the present disclosure may be used to purify molecules. The purified molecules may be eluted in sufficiently high concentrations for further purification without requiring additional concentration or processing.

The contents of this summary section are provided only as a simplified introduction to the disclosure and are not intended to be used to limit the scope of the claims. These, as well as other components, steps, features, objects, benefits, and advantages, will now become clear from a review of the following detailed description of illustrative embodiments, and of the claim.

BRIEF DESCRIPTION OF THE DRAWINGS

The drawings show illustrative embodiments, but do not depict all embodiments. Other embodiments may be used in addition to or instead of the illustrative embodiments. Details that may be apparent or unnecessary may be omitted for the purpose of saving space or for more effective illustrations. Some embodiments may be practiced with additional components or steps and/or without some or all components or steps provided in the illustrations. When different drawings contain the same numeral, that numeral refers to the same or similar components or steps.

DETAILED DESCRIPTION OF THE ILLUSTRATIVE EMBODIMENTS

Figure 1:
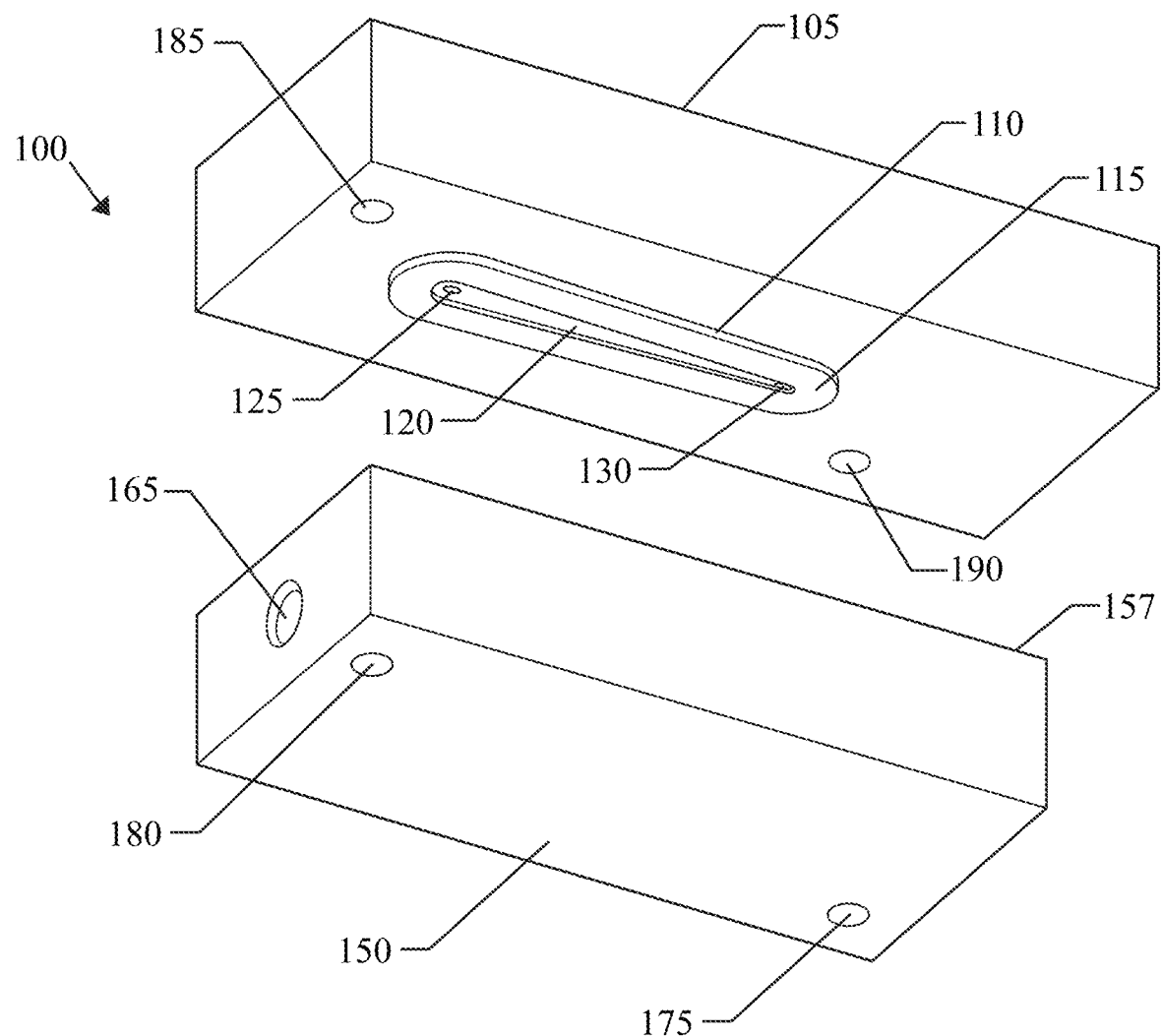
FIG. 1 is an illustration of a perspective view of one embodiment of a molecular filtration device.

Before the present device, methods, and systems are disclosed and described, it is to be understood that the methods and systems are not limited to specific device and methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

The present methods and systems may be understood more readily by reference to the following detailed description of preferred embodiments and the examples included therein and to the Figures and their previous and following description.

In the following description, certain terminology is used to describe certain features of one or more embodiments. For purposes of the specification, unless otherwise specified, the term "substantially" refers to the complete or nearly complete extent or degree of an action, characteristic, property, state, structure, item, or result. For example, in one embodiment, an object that is "substantially" located within a housing would mean that the object is either completely within a housing or nearly completely within a housing. The exact allowable degree of deviation from absolute completeness may in some cases depend on the specific context. However, generally speaking, the nearness of completion will be so as to have the same overall result as if absolute and total completion were obtained. The use of "substantially" is also equally applicable when used in a negative connotation to refer to the complete or near complete lack of an action, characteristic, property, state, structure, item, or result.

As used herein, the terms "approximately" and "about" generally refer to a deviance of within 5% of the indicated number or range of numbers. In one embodiment, the term "approximately" and "about", may refer to a deviance of between 0.001-10% from the indicated number or range of numbers.

As used herein, "ul" refers to microliter, "ml" refers to milliliter, and "ng" refers to nanogram.

Various embodiments are now described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Various embodiments presented in terms of systems may comprise a number of components, modules, and the like. It is to be understood and appreciated that the various systems may include additional components, modules, etc. and/or may not include all of the components, modules, etc. discussed in connection with the figures. A combination of these approaches may also be used.

Figure 3:
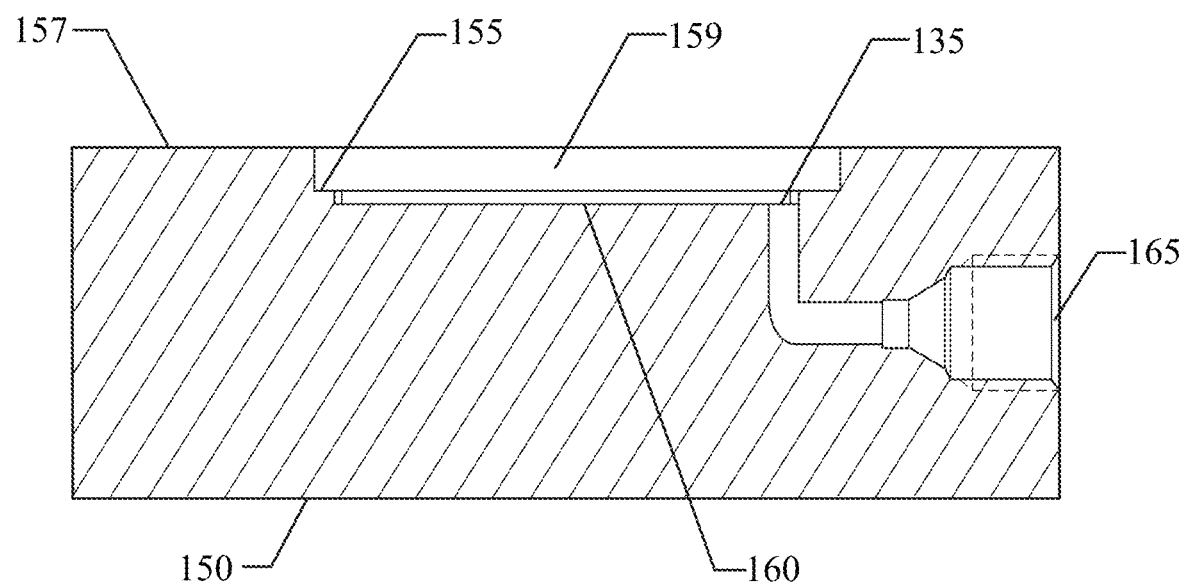
FIG. 3 is an illustration of a cross-sectional view of one embodiment of a lower portion of the molecular filtration device.
Figure 4:
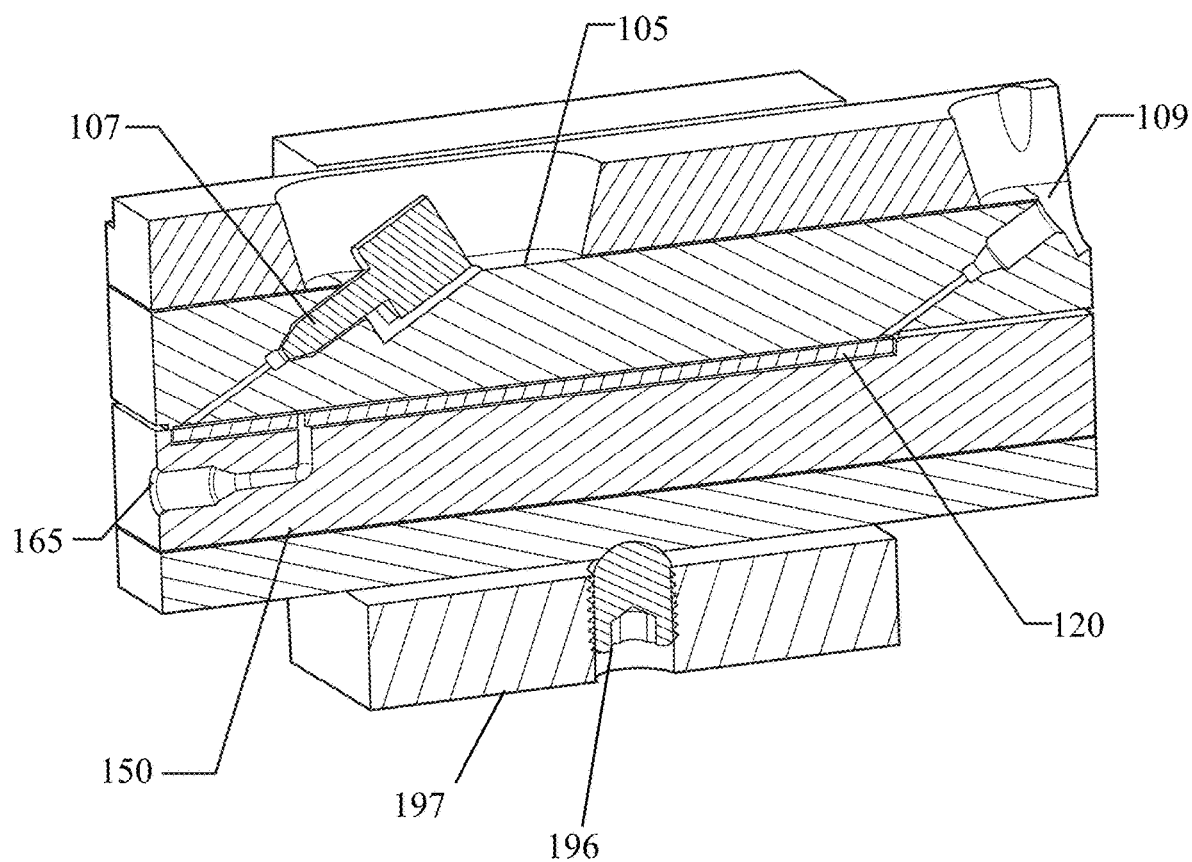
FIG. 4 is an illustration of a cross-sectional view of one embodiment of the upper portion and lower portion of the molecular filtration device in an assembled configuration.
Figure 5:
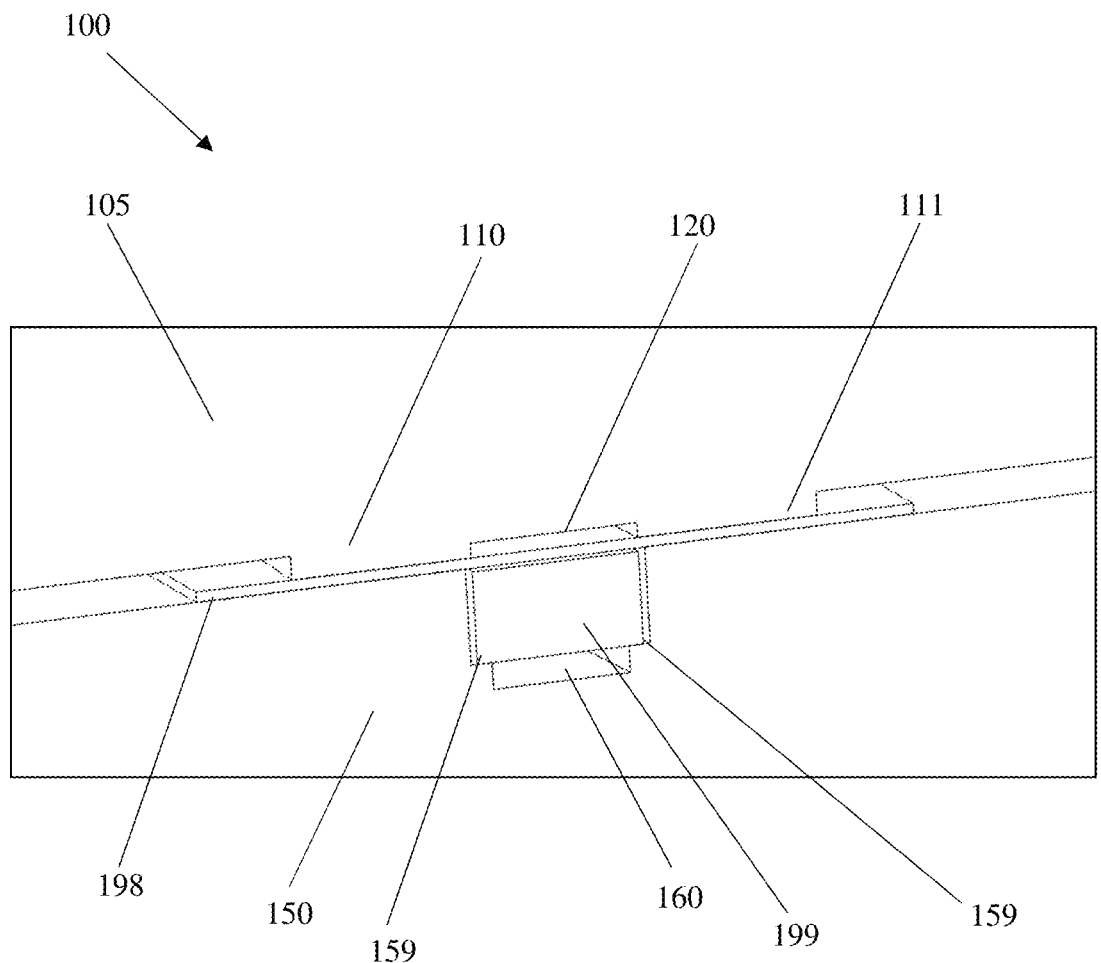
FIG. 5 is an illustration of a cross-sectional view of one embodiment of the molecular filtration device including a frit.

FIG. 1 is an illustration of one embodiment of a molecular filtration device. As shown in FIG. 1, the molecular filtration device 100 may comprise an upper portion 105 and a lower portion 150. The upper portion 105 may comprise a first upper port 125, second upper port 130, channel forming lip 110, and upper securing structures 185, 190. The lower portion 150 may comprise an upper sealing surface 157, a lower port 165, and lower securing structures 175, 180. As shown in FIGS. 3-5, detailed more fully herein below, the lower portion 150 may also comprise a frit portion 159, frit supporting lip 155, and reservoir 160.

The first upper port 125 and second upper port 130 may be configured to receive solution flow devices, wherein the solution flow devices may be connected to pumps through solution transfer structures such that each of the flow devices may be able to independently adjust the flow rate through the upper ports 125, 130, including reversing the flow direction of the solution. For example, the flow of solution may be such that the solution is ejected from the first upper port 125 and taken up by the second upper port 130. Alternatively, solution may be ejected from both the first and second upper ports 125, 130.

Similar to the first and second upper ports 125, 130, the lower port 165 may be configured to receive a lower flow device configured to inject or withdraw solution from the reservoir 160. As used herein, the terms inject and withdraw do not necessarily denote the mechanism for causing flow of solution, but rather are used to denote the direction of flow of solution.

The channel forming lip 110 may be a protrusion of the upper portion 105 comprising a lower sealing surface 115. The channel forming lip 110 may comprise a channel forming cavity 120, wherein when the lower sealing surface 115 of the upper portion 105 and the upper sealing surface 157 of the lower portion 150 are engaged with a membrane in between them, such that the channel forming cavity 120 forms a channel.

The first and second upper ports 125, 130 may allow for the flow of solution into and/or through the channel formed by channel forming cavity 120, depending on the direction of the flow of solution through the first and second upper ports 125, 130.

In a preferred configuration, a membrane may be placed and secured between the upper sealing surface 157 of the lower portion 150 and lower sealing surface 115 of the upper portion 105 when the upper sealing surface 157 and lower sealing surface 115 are fitted together and engaged. The membrane may allow for molecules of a certain size or characteristic to pass through, while preventing other, often larger, molecules from passing through the membrane. The membrane may be subjected to relatively high pressure due to the upper ports 125, 130 injecting liquid into the channel, with pressures reaching as high as 1,500 psig, or as low as 0 psig. Generally, the higher the pressure that is applied to the membrane, the faster the solution may pass through the membrane, provided the membrane is not structurally compromised by the higher pressure. One method of increasing the maximum operational pressure for the membrane is to provide the membrane with an additional rigid support structure, such as a frit.

In one embodiment, the first and second upper ports 125, 130 may be configured to inject a solution comprising desired molecules for isolation and purification, along with other, non-desired molecules, into the channel formed by the membrane and the channel forming cavity 120. As solution is injected into the channel formed by the membrane and the channel forming cavity 120, pressure increases, and the solution, along with molecules capable of passing through the membrane, may pass through the membrane, thereby passing into the reservoir 160 (shown in FIG. 3) and then out through the lower port 165. After a desired amount of the solution has passed through the membrane, the desired molecules may be concentrated in the channel formed by the membrane and the channel forming cavity 120, and on the membrane. In order to elute the desired molecules, the flow direction of the second upper port 130 and the lower port 165 may be reversed, such that the solution may be injected into the reservoir 160 and the channel formed by the membrane and the channel forming cavity 120 through the lower port 165 and first upper port 125, respectively, and the solution may be eluted from the second upper port 130. Alternatively, the first upper port 125 may allow for no flow, such that flow is solely from the lower port 165 to the second upper port 130. By this process, the solution having the desired molecule may be eluted through the second upper port 130 in a relatively small volume of solution or buffer.

In a preferred embodiment, very dilute amounts of molecules in relatively large volumes may be pushed through the first and second upper ports 125, 130 until substantially all of the desired molecules are in the channel formed by the membrane and the channel forming cavity 120. A buffer solution having a desired characteristic may then be run through the first and second upper ports 125, 130 in order to wash the desired molecule and ensure that all of the non-desired molecules capable of passing through the membrane are passed through the membrane, such as into a waste container. At that point the now concentrated and purified desired molecules may be retrieved through the second upper port 130. A buffer container may then be connected to the lower port 165 to inject a buffer into the reservoir 160, such that the desired molecule in the buffer solution is eluted into the second upper port 130 for collection and further use.

The upper portion 105 and lower portion 150 may be made of stainless steel, or other material of suitable strength and general non-reactivity. The membrane may be made of regenerated cellulose, polyether sulfone, cellulose acetate or other material that may create pore sizes of defined size and distribution.

Figure 2:
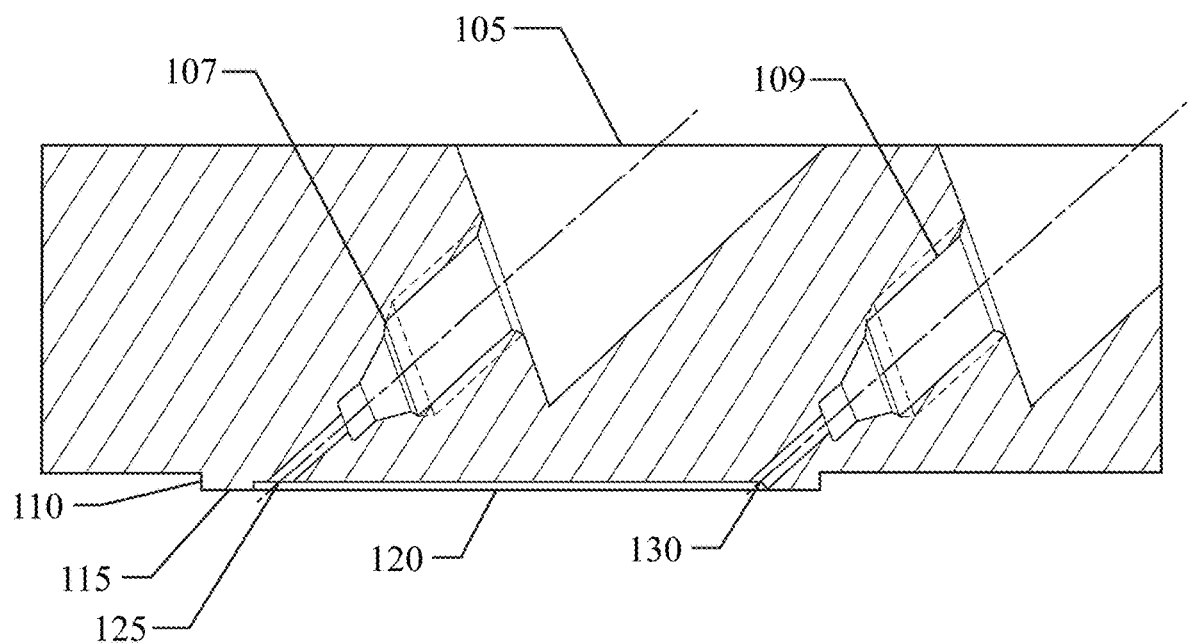
FIG. 2 is an illustration of a cross-sectional view of one embodiment of an upper portion of the molecular filtration device.

FIG. 2 is an illustration of a cross-sectional view of one embodiment of an upper portion of the molecular filtration device. As shown in FIG. 2, the first upper flow device 107 and second upper flow device 109 may be configured to engage the first upper port 125 and second upper port 130, respectively. The channel forming cavity 120 may be extremely small in volume relative to the upper portion 105. The channel forming cavity 120 may be about 5 uL to about 50 uL. In one embodiment, the channel forming cavity 120 may be about 14.6 uL.

FIG. 3 is an illustration of a cross-sectional view of one embodiment of a lower portion of the molecular filtration device. As shown in FIG. 3, the lower portion 150 may comprise an upper sealing surface 157, top end of lower port 135, frit receiving portion 159, frit supporting lip 155, and reservoir 160. The lower end of lower port 165 may be configured to receive a lower flow device.

FIG. 4 is an illustration of a cross-sectional view of one embodiment of the upper portion and lower portion of the molecular filtration device in an assembled configuration. As shown in FIG. 4, the first upper flow device 107 and second upper flow device 109 may be angled relative to the channel forming cavity 120. In one embodiment, the upper flow devices 107, 109 may be between 15 and 165 degrees relative to the bottom surface of the upper portion 105.

The molecular filtration device 100 may also comprise a pressure application mechanism 197, which may be configured to apply a force such that the upper portion 105 and lower portion 150 are pressed toward one another. This pressure application mechanism 197 may be used to apply a specific pressure to a membrane placed between the upper portion 105 and lower portion 150. Pressure may be adjusted by turning the set screw 196.

FIG. 5 is an illustration of a cross-sectional view of one embodiment of the molecular filtration device including a frit. As shown in FIG. 5, when the upper portion 105 and lower portion 150 are fitted together and engaged, a membrane 198 and frit 199 may be compressed between the upper portion 105 and lower portion 150. In one embodiment, the molecular filtration device 100 may be assembled as by placing the frit 199 on the frit supporting lip 159 of the lower portion 150. On top of the frit 199, the membrane 198 of a desired permeability may be placed. Then, on top of the membrane 198, the upper portion 105 may be placed, such that the channel forming lip 110, 111 engages the membrane 198. The frit 199 preferably may have a permeability higher than that of the membrane 198. As shown in FIG. 5, the channel 120 may be a cavity enclosed by the upper portion 105, channel forming lip 110, 111, and membrane 198, wherein the membrane 198 may be structurally supported by the frit 199.

Figure 6:
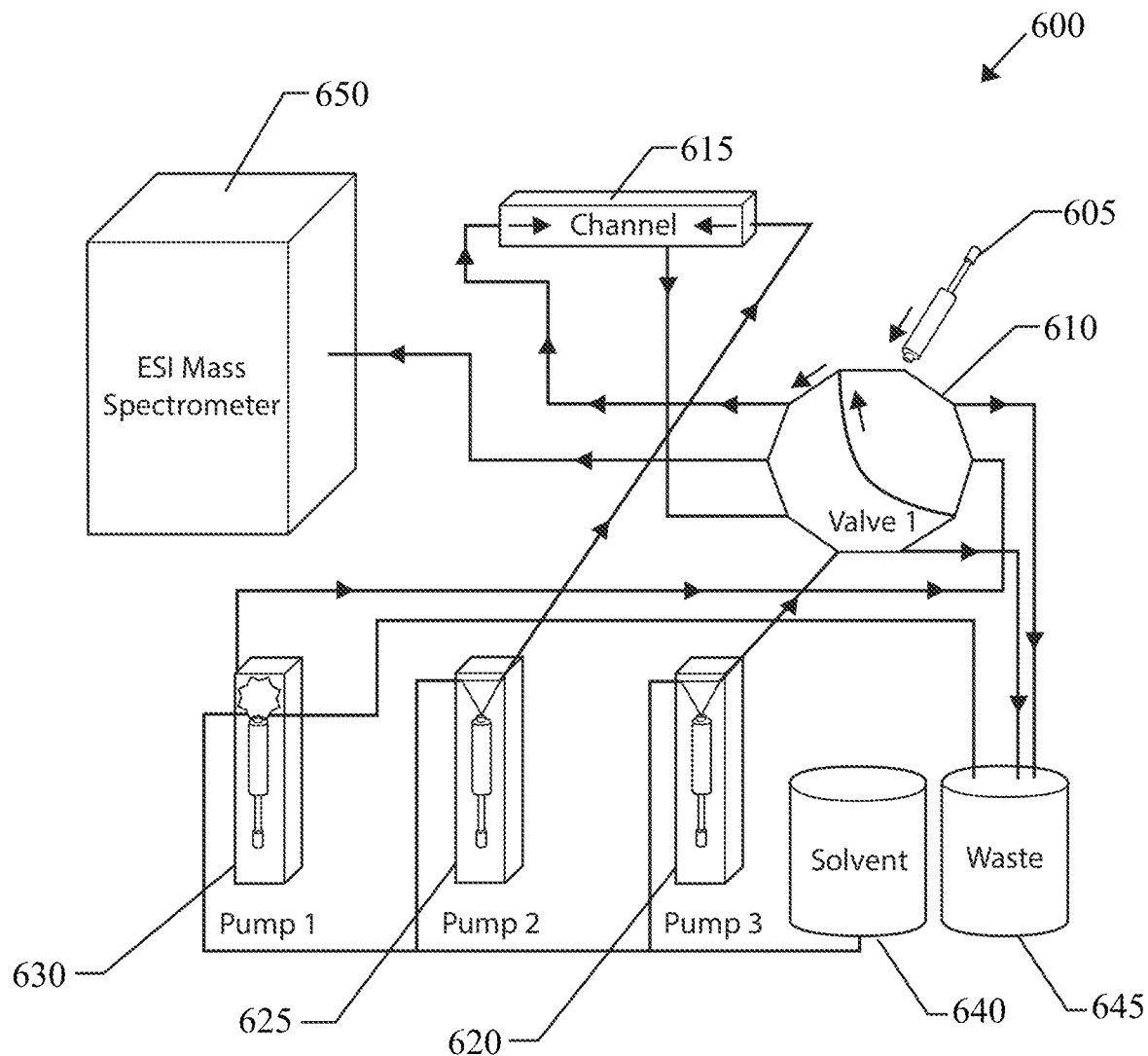
FIG. 6 is a diagram showing the molecular filtration device being prepared for use.

FIG. 6 is a diagram showing the molecular filtration device being prepared for use. As shown in FIG. 6, one embodiment of the molecular filtration system 600 may comprise an injection mechanism 605, injection valve 610, molecular filtration device 615, first pump 630, second pump 625, third pump 620, solvent container 640, waste container 645, and analysis machine 650.

In one embodiment the injection mechanism 605 may be a syringe and during a cleaning protocol, may be used to run a clean buffer solution through the injection valve 610. The pumps 620, 625, 630 may be configured to clean the entire system by flushing clean buffer solution through the flow lines, molecular filtration device 615, and into the waste container 645. After clean buffer is flushed through the flow lines, the sample may be introduced to the system. Specifically, a sample comprising a molecule for filtration and purification may be loaded into the injection mechanism 605 and injected into the injection valve 610. The first pump 630 may then pump the sample into the molecular filtration device 615 via a first upper port. At approximately the same time, the second pump 625 may pump a buffer solution from the solvent container 640 into the molecular filtration device 615 via a second upper port, and the resulting waste solution may be pumped into the analysis machine 650. Once the sample is completely loaded and washed such that impurities able to pass through a membrane of the molecular filtration device 615 are substantially or entirely removed, then what may remain in the molecular filtration device 615, specifically in the channel, may be a sufficiently pure sample.

Figure 7:
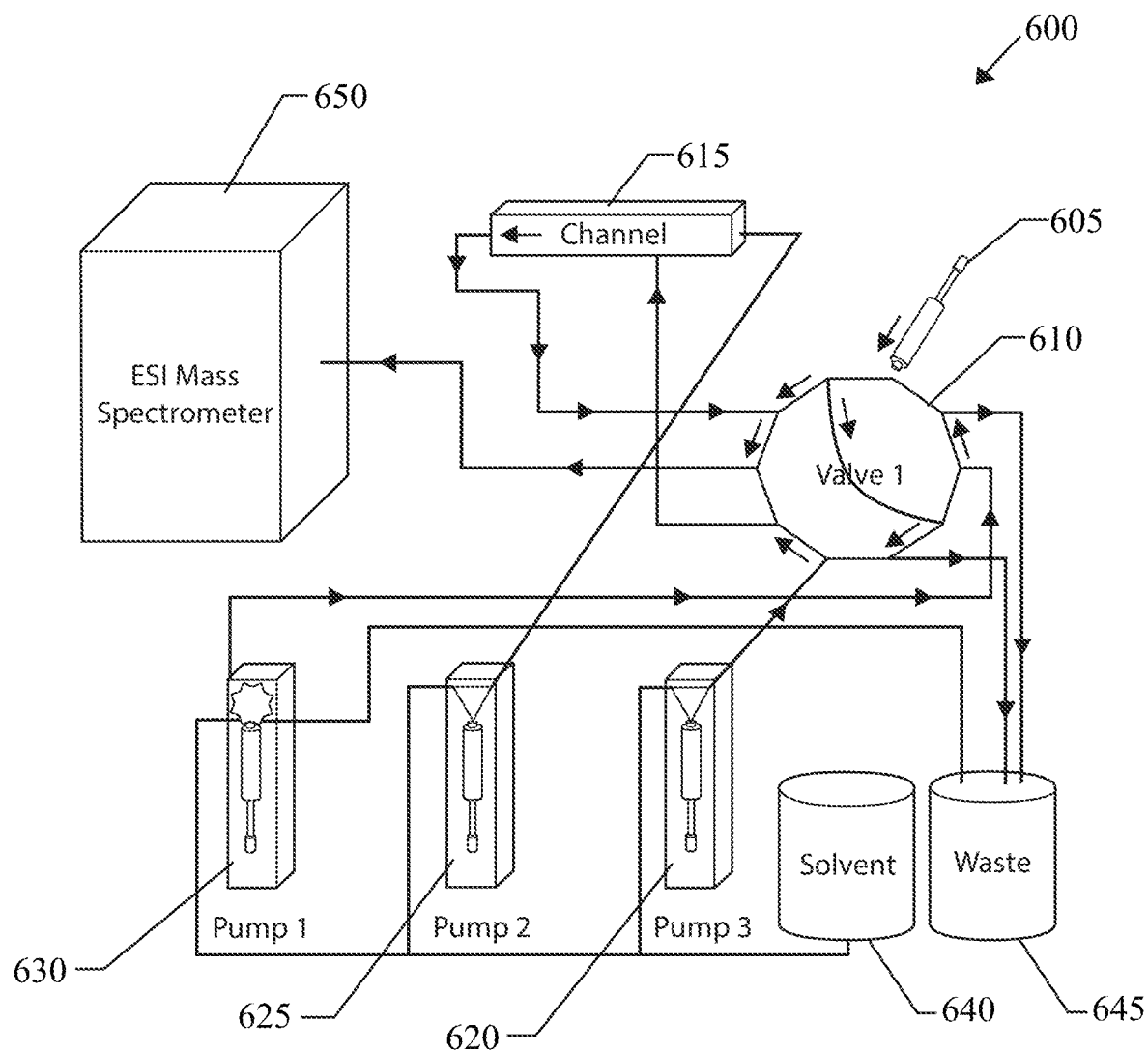
FIG. 7 is a diagram showing the molecular filtration device in use for elution and analysis.

FIG. 7 is a diagram showing the molecular filtration device in use for elution and analysis. After the molecular filtration device 615 contains a sufficiently pure sample, the direction of flow of the pumps 620, 625, 630 may be modified in order to efficiently elute the sample in a high concentration in order to allow for further analysis. Specifically, the second pump 625 may stop pumping, thereby effectively blocking the second port of the molecular filtration device 615. Solution may then be pumped into the lower port of the molecular filtration device 615, and then out of the first upper port and into the injection valve 610. The injection valve 610 may then be configured to directly pump the now purified sample into an analysis machine 650 for further analysis. The entire process shown in FIGS. 6 and 7 may be automated for ease of use and consistency. The analysis machine 650 may be any machine into which a sufficiently pure sample may be analyzed, such as a Mass Spectrometer.

In one embodiment more than one molecular filtration device 615 may be used in parallel. When more than one molecular filtration device 615 is used, the sample may be loaded in approximately 21 seconds, focused/washed in approximately 38 seconds, and eluted in approximately 33 seconds. Additionally, a sample may be loaded/focused on a first molecular filtration device while a sample in a second molecular filtration device is being eluted. In alternate embodiments, the molecular filtration device may proceed with being loaded while a sample is being eluted, in order to increase the throughput of sample in the molecular filtration device. In yet further embodiments, additional molecular filtration devices 615 may be used, provided that hardware is adequate to support said additional molecular filtration devices 615.

Figure 8A:
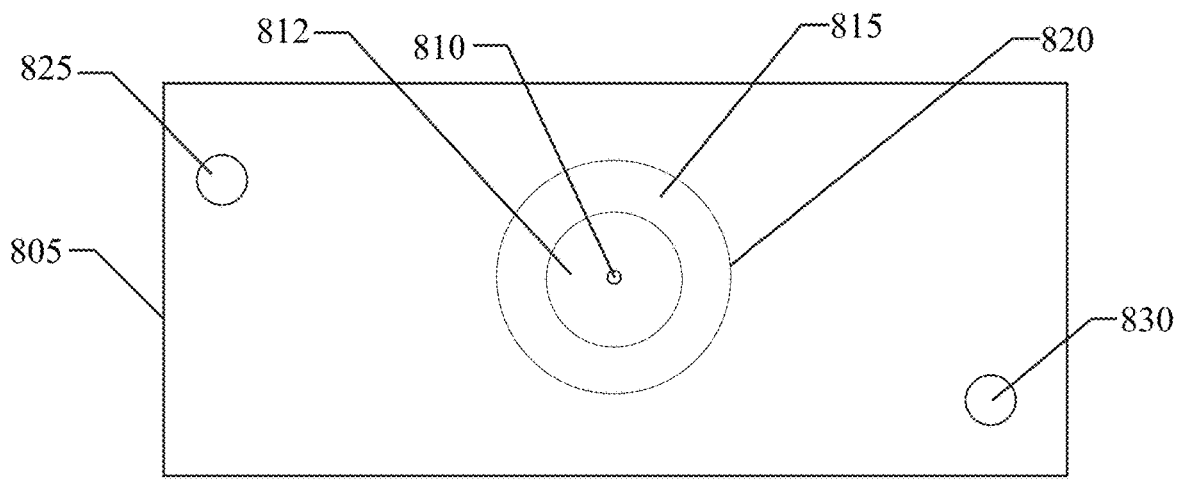
FIGS. 8A-C are illustrations of different channel shapes of the molecular filtration device.
Figure 8B:
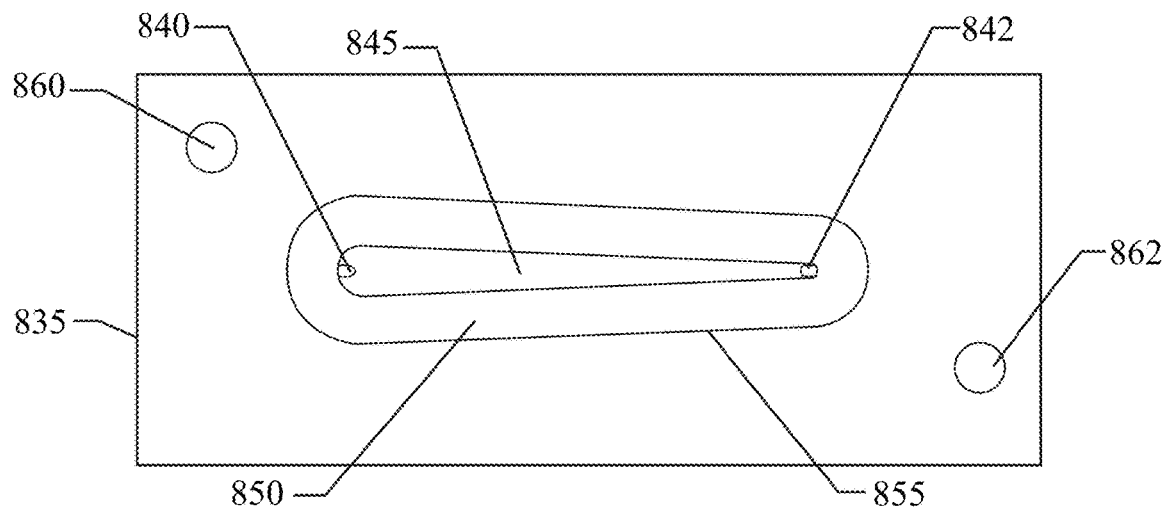
Figure 8C:
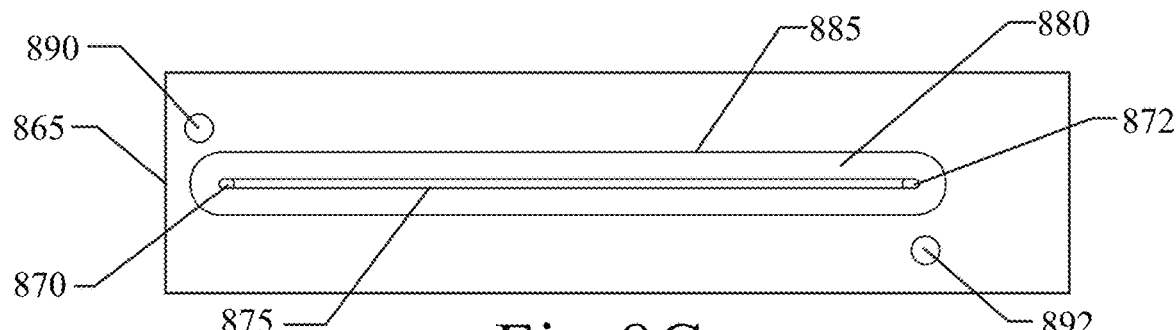

FIGS. 8A-C are illustrations of different channel shapes of the molecular filtration device.

As shown in FIG. 8A, an upper portion 805 may comprise a channel forming cavity 812 that is substantially circular in shape. In this embodiment, the upper portion 805 may have a single upper port 810. The shape of the channel forming cavity 812 may be substantially defined by the channel forming lip 820 and its lower sealing surface 815. The upper portion 805 may also comprise securing structures 825, 830.

As shown in FIG. 8B, an upper portion 835 may comprise a channel forming cavity 845 that is substantially elongated teardrop in shape. In this embodiment, the upper portion 835 may have two upper ports 840, 842. The shape of the channel forming cavity 845 may be substantially defined by the channel forming lip 855 and its lower sealing surface 850. The upper portion 835 may also comprise securing structures 860, 862.

As shown in FIG. 8C, an upper portion 865 may comprise a channel forming cavity 875 that may be a substantially elongated oval shape. In this embodiment, the upper portion 865 may have a two upper ports port 870, 872. The shape of the channel forming cavity 875 may be substantially defined by the channel forming lip 885 and its lower sealing surface 880. The upper portion 865 may also comprise securing structures 890, 892.

Figure 9:
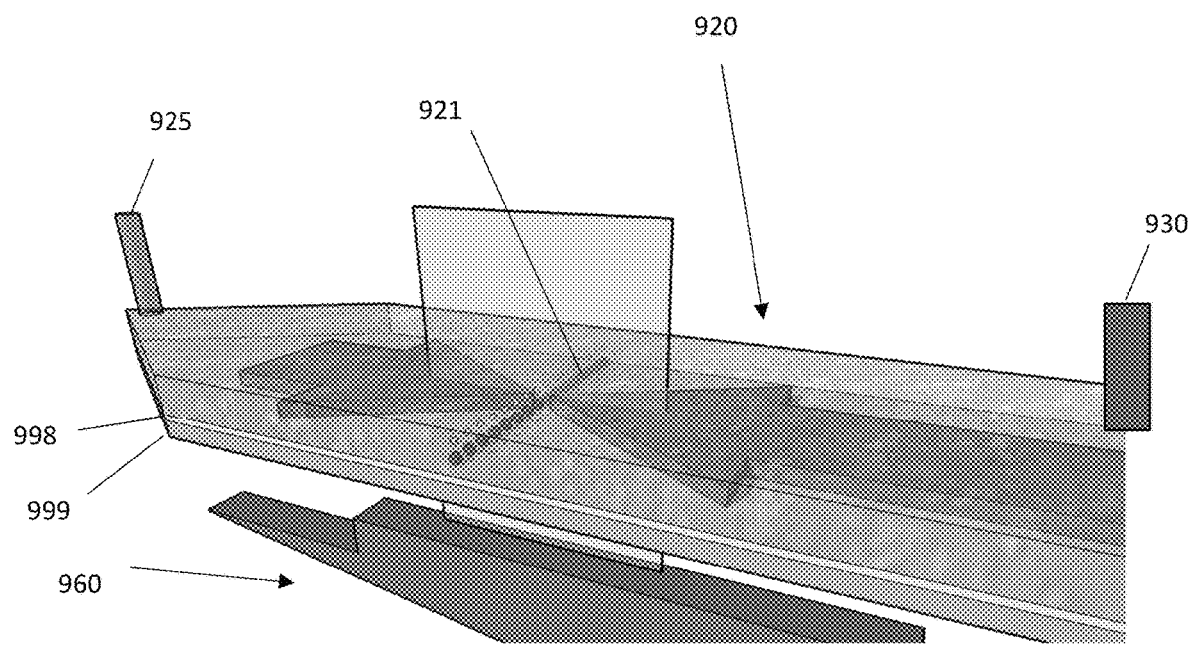
FIG. 9 is an illustration showing a channel of the molecular filtration device.

FIG. 9 is an illustration showing a channel of the molecular filtration device. As shown in FIG. 9, the channel 920 may have solution pumped into it via a first upper port 925 and second upper port 930, which may cause molecules to create a band 921 near a substantial midpoint of the flow caused by the first upper port 925 and second upper port 930. The flow of solution may then cause molecules, including solvent, smaller than a particular size to cross a membrane 998 and frit 999 and pass into the reservoir 960 or outflow mechanism. The creation of the band 921 allows for the membrane 998 to remain relatively unclogged, and allow for greater filtration, washing, and concentration of molecules caught in the band 921.

Experiment 1: Pressure Test on Compressed Membrane

Figure 10:
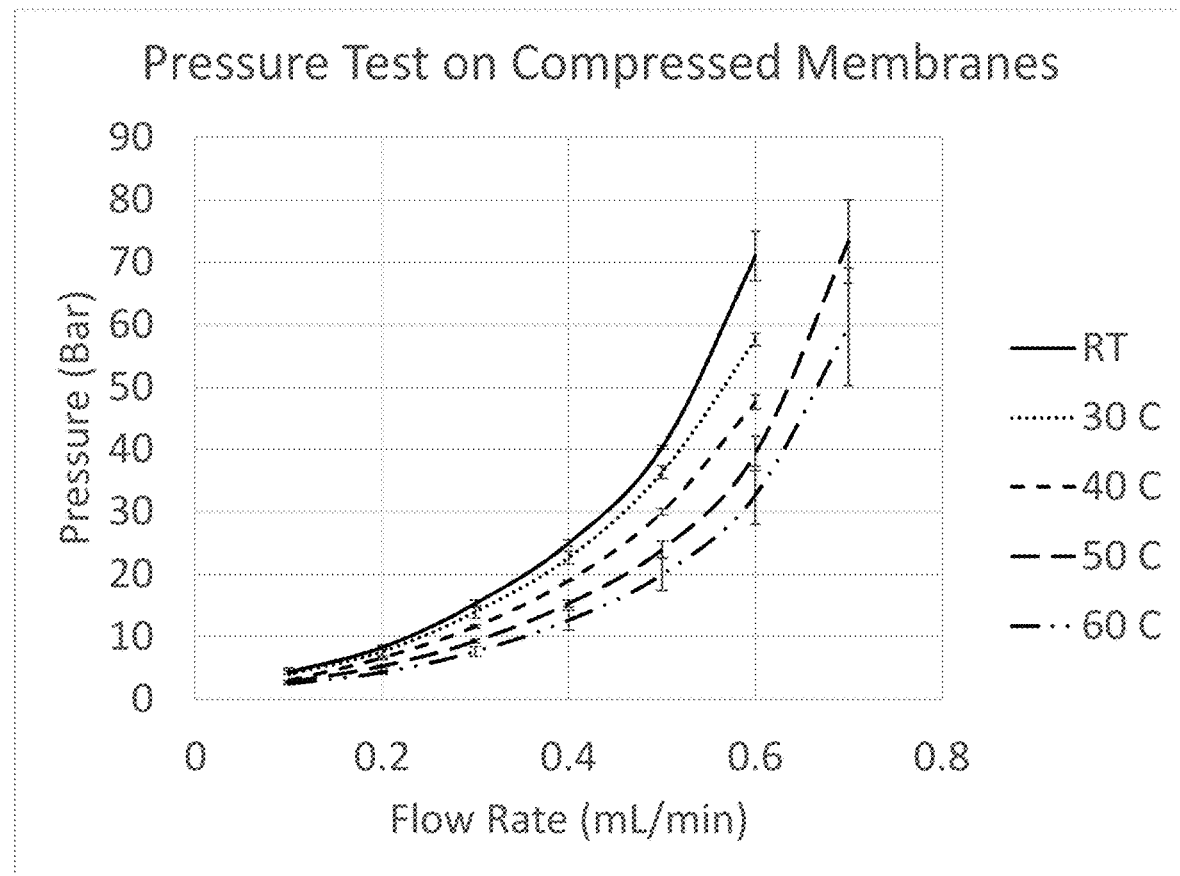
FIG. 10 is a graph showing flow rate v. pressure for compressed membranes in the molecular filtration device.

The effects of pressure on a membrane compressed by the device of the present disclosure was tested. A 10 kDa membrane was installed in a molecular filtration device, and the flow rate was increased until the pressure on the membrane by the flow of solution reached 100 bar. The results of this experiment are shown in FIG. 10. Importantly, it was discovered that the membrane being compressed by the molecular filtration device of the present disclosure must be pressurized up to 100 bar in order to allow for the pressure measurements to increase as observed by increasing flow rate. One potential explanation for this is that the spun support on which the membrane is cast may have been crushed, leading to increased back pressure.

Experiment 2: Behavior of Unpressurized Membrane

Figure 11:
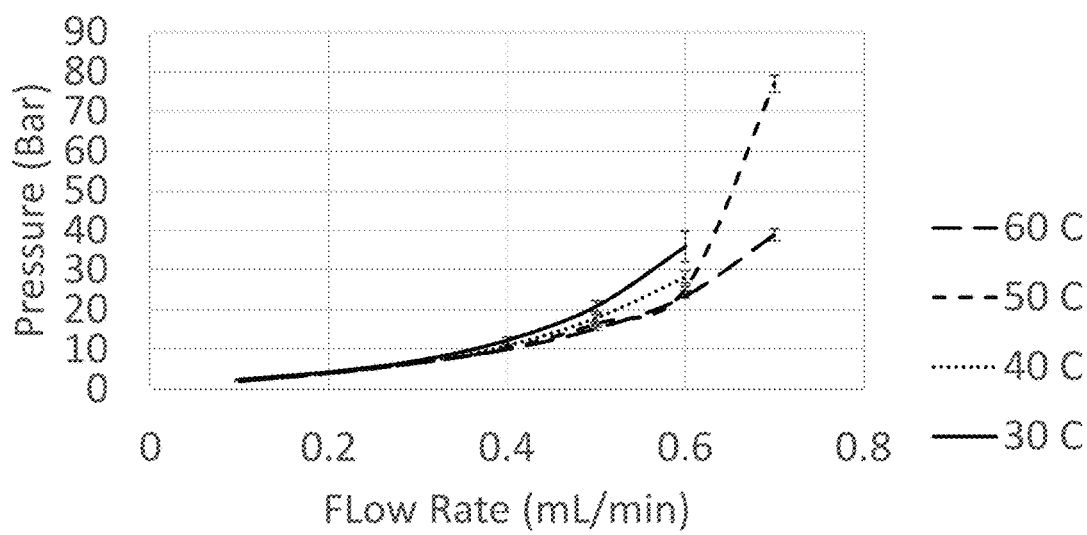
FIG. 11 is a graph showing flow rate v. pressure for uncompressed membranes in the molecular filtration device.

The effects of pressure on an uncompressed membrane was tested. A 10 kDa membrane was installed in a molecular filtration device, and flow rate was increased. The results of this experiment are shown in FIG. 11. Importantly, it was discovered that the pressure experienced by the uncompressed membrane, compared to the compressed membrane of Experiment 1 hereinabove, was significantly less than when the membrane was compressed. Additionally, when the membrane was uncompressed, the temperature of the experiment had a significantly smaller effect on the relationship between flow rate and pressure. The data shows that a useful forward flow rate may be around 500 uL/min.

Experiment 3: Reverse Flow Through Membrane

Figure 12:
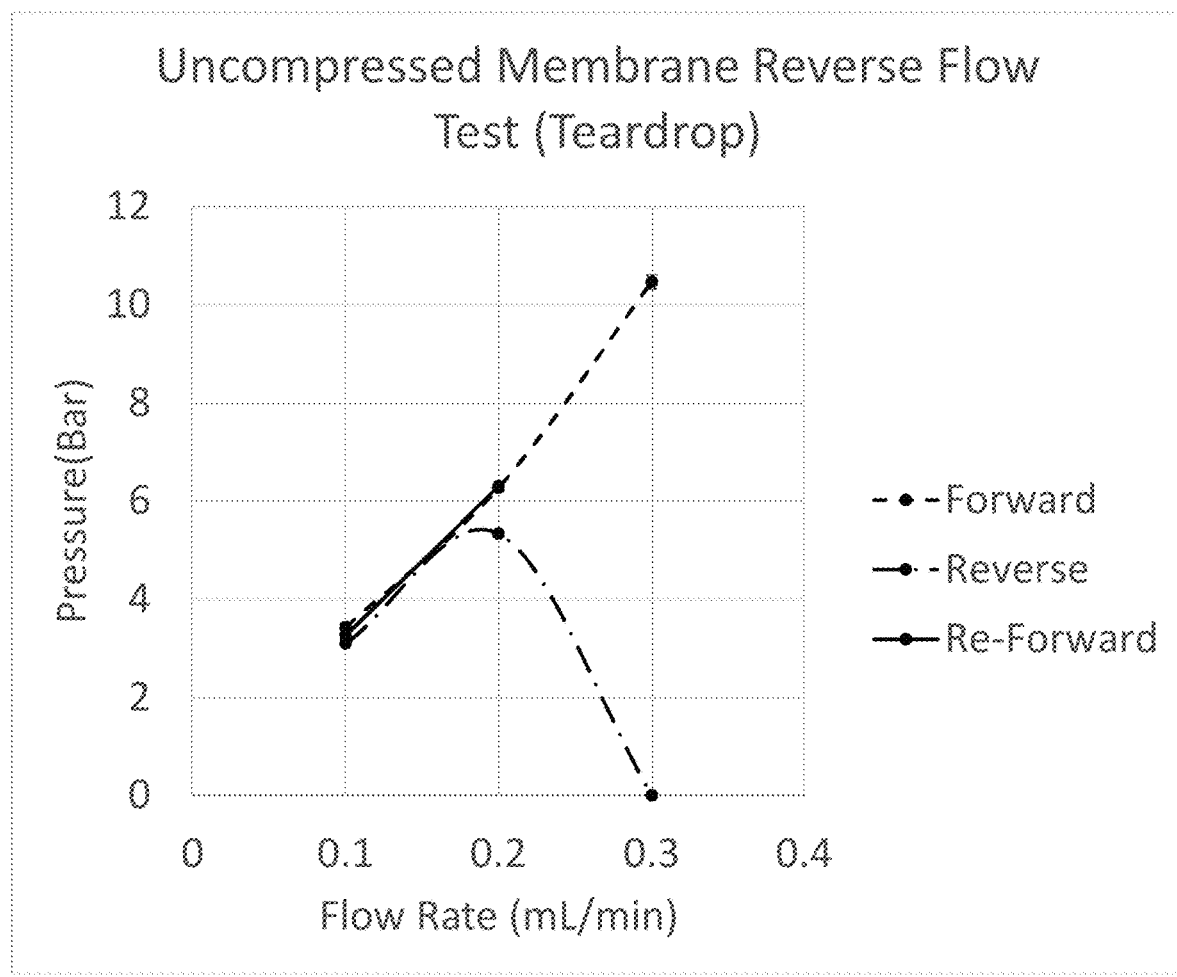
FIG. 12 is a graph showing flow rate v. pressure for different flow directions in the molecular filtration device.

The effects of reversing flow of solution at different flow rates was measured. A 10 kDa membrane was installed in a molecular filtration device, and the flow was forward, reversed, and then re-forwarded at increasing flow rates. The results of this experiment are shown in FIG. 12. The membrane experienced failure when in a reverse flow rate of between 200 and 300 uL/min were applied. Thus, a useful reverse flow rate was between 100 and 200 uL/min, which may be somewhat comparable to current 2.1 mm column chromatographic methods.

Experiment 4: Forward Flow Through Uncompressed 1 kDa Membrane

Figure 13:
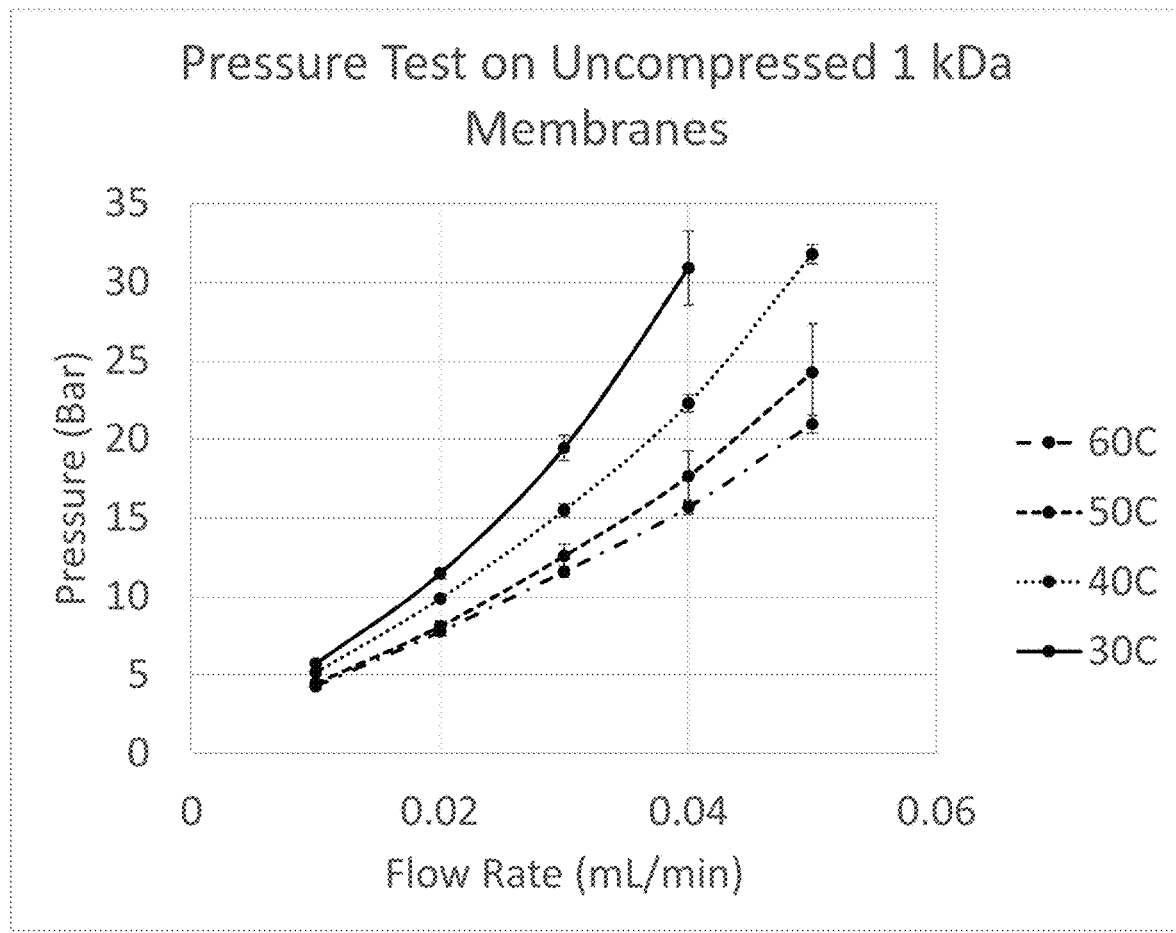
FIG. 13 is a graph showing flow rate v. pressure for uncompressed 1 kDa membranes in the molecular filtration device.

The effects of pressure on an uncompressed membrane was tested. A 1 kDa membrane was installed in a molecular filtration device, and flow rate was increased. The results of this experiment are shown in FIG. 13. The 1 kDa membrane experienced pressures approximately 10× that experienced by a 10 kDa membrane at similar flow rates. Experiments with 1 kDa membranes and 10 kDa membranes experienced similar pressures when the flow rate of the 10 kDa membrane was 10 times that of the 1 kDa membrane.

Experiment 5: Reverse Flow Through 1 kDa Membrane

Figure 14:
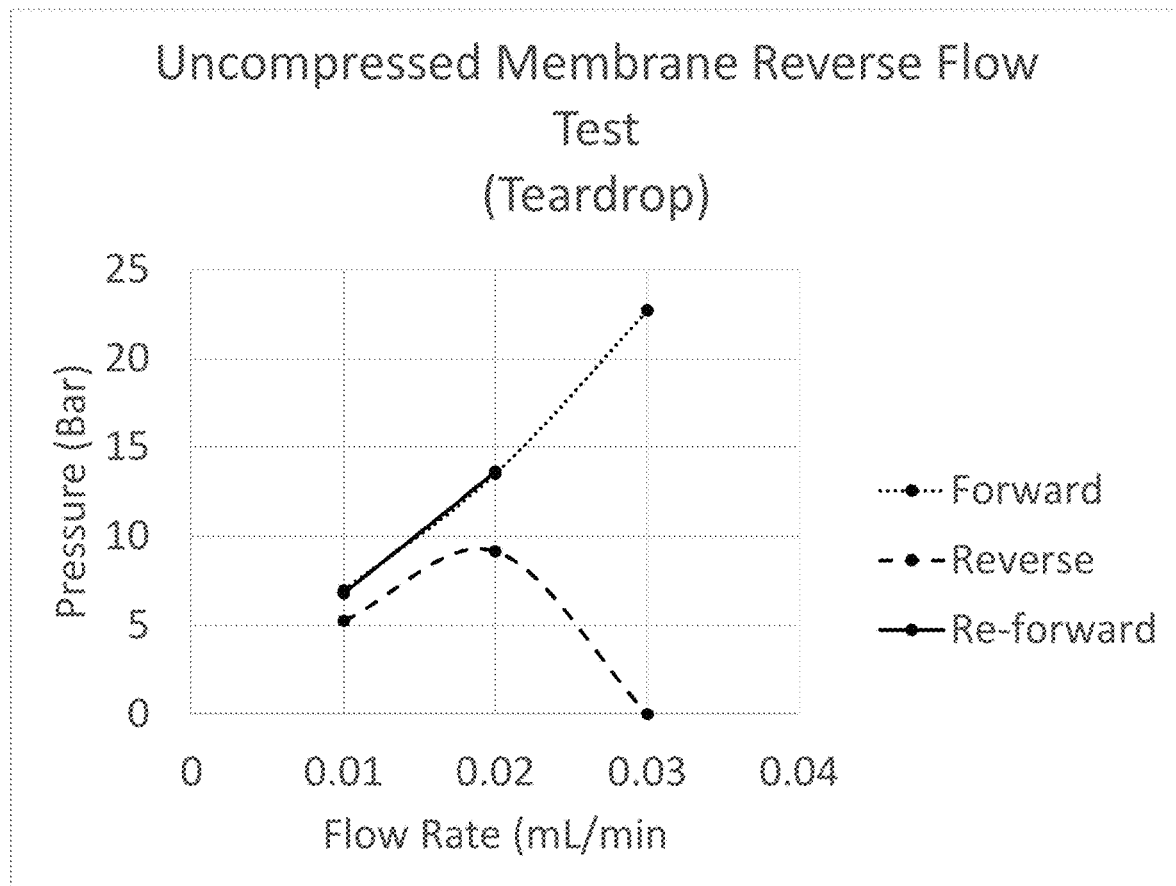
FIG. 14 is a graph showing flow rate v. pressure for different flow directions in the molecular filtration device with a 1 kDa membrane.

The effects of reversing flow of solution at different flow rates was measured. A 1 kDa membrane was installed in a molecular filtration device, and the flow was forward, reversed, and then re-forwarded at increasing flow rates. The results of this experiment are shown in FIG. 14. The membrane experienced failure when in a reverse flow rate of between 20 and 30 uL/min were applied. Thus, a useful flow rate, forward and backward, was between 10 and 20 uL/min. Similar to Experiment 3, the data indicates that the membrane becomes ruptured around 10 bar.

Experiment 6: Reverse Flow Analysis of Various Channel Geometries

Figure 15:
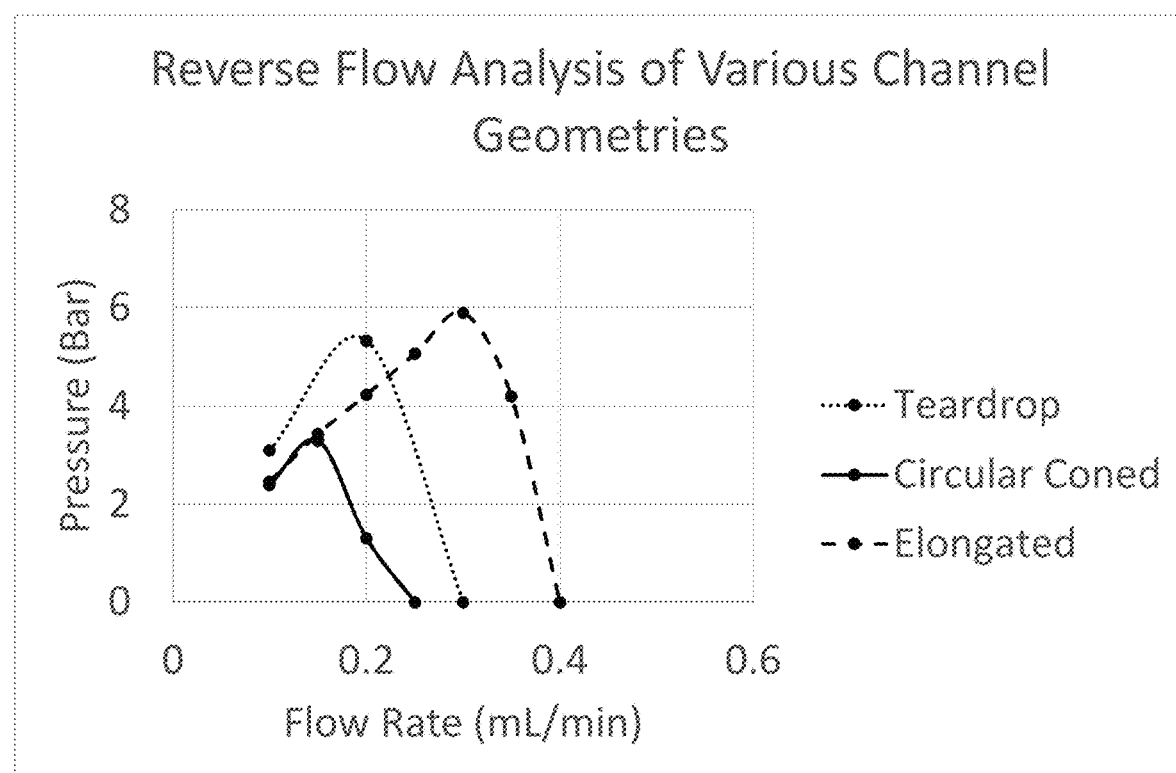
FIG. 15 is a graph showing the effects of channel geometry on membrane stability.

The effects of channel shape and its effects on membrane stability at different flow rates was measured. The results of this experiment are shown in FIG. 15. As shown in FIG. 15, the shape of the channel has a significant effect on the amount of pressure the membrane may be able to tolerate when flow is reversed before experiencing structural failure. Particularly, the elongated shaped channel is the most resilient, while the circular coned shaped channel is the least resilient of the three channel shapes tested. The teardrop shaped channel's resilience is between that of the elongated shape and circular cone shaped channels. The elongated channel has a 0.03 mm maximum span, and a 150 um channel height. The teardrop channel has a 0.125 mm maximum span and a 250 um channel height. The circular channel has a 0.343 mm maximum span, and a coned height of 250 um to 450 um or flat 150 um channel height.

An increased span generally results in a lower reverse membrane flow rate due to membrane lift resulting from no frit or supporting structure above the membrane.

Experiment 7: Comparison of Molecular Filtration Device and Standard Chromatography A comparison of the molecular filtration device and standard chromatography was conducted. Both the molecular filtration device and chromatography were analyzed by a Q Exactive™ Plus mass spectrometer, manufactured by Thermo Scientific™.

The chromatography included: 2.1 mm i.d. Agilent PLRP-S column; at 65 C; sample injection volume of 5 µL having 100 ng of sample; flow rate of 100 µL/min; A: 0.1% FA B: ACN+0.1% FA; and Gradient: 0 min 20% b; 2 min 20%; 4.75 min 65%; 5 min 80% b; 5.5 min 15%; 5.75 85%; 6 min 15%; 6.25 85%; 6.5 min 15% 1605.

The molecular filtration device had a flow rate of 100 uL/min, with a 100 uL sample injection volume having 100 ng of sample 1600.

Figure 16:
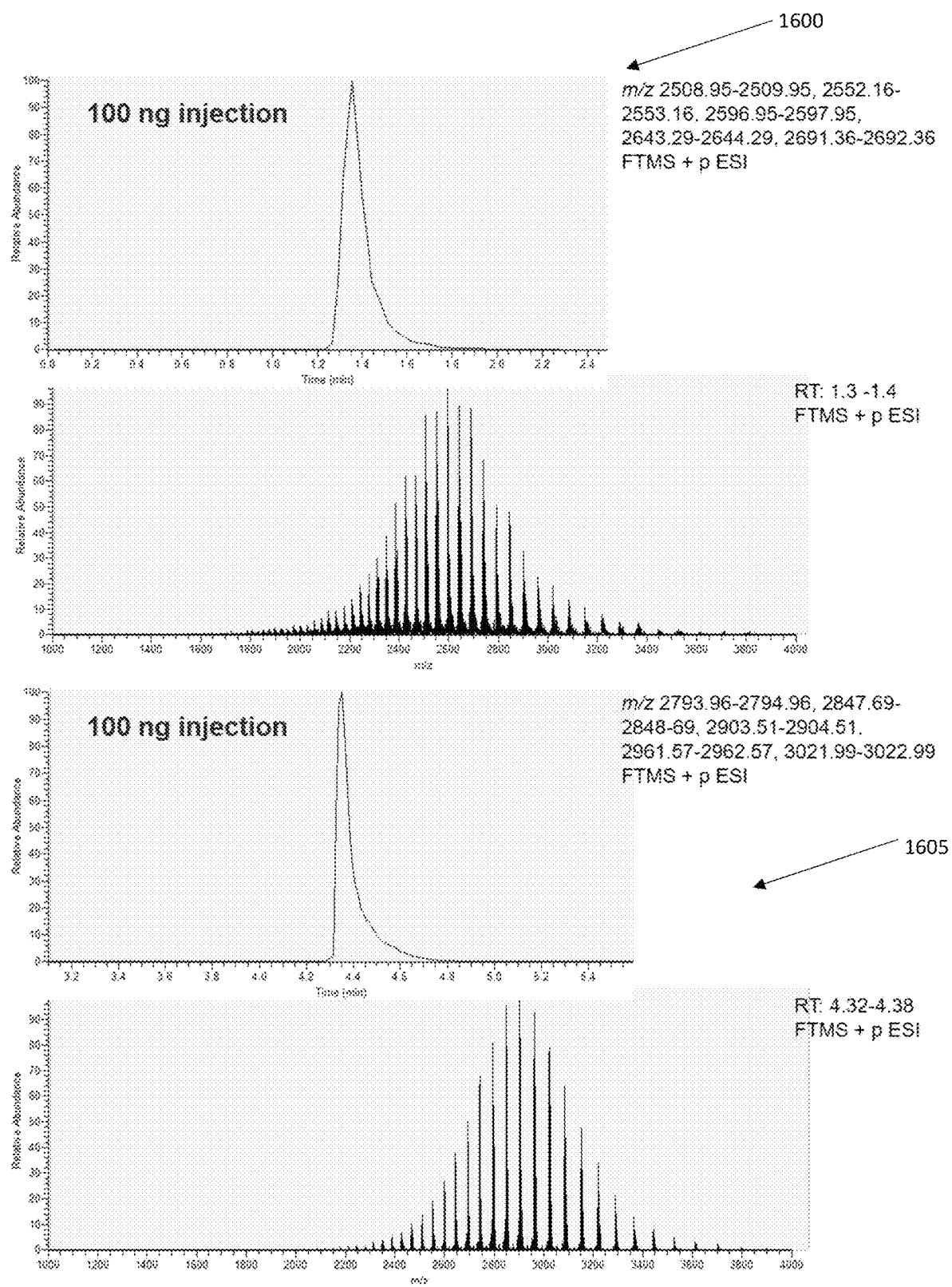
FIG. 16 is a set of graphs showing the efficacy of the molecular filtration device compared to traditional filtration methods.

As shown in FIG. 16, despite the fact that the chromatography method included a much smaller sample injection volume, the molecular filtration volume eluted the desired sample with in a band similar to that of chromatography. Further, the molecular filtration device was able to elute the sample much more quickly than the chromatography method. Accordingly, the molecular filtration device is highly effective at analyzing significantly more dilute samples than traditional methods, including liquid chromatography.

Experiment 8: Molecular Filtration Device to Mass Spectrometer

Figure 17:
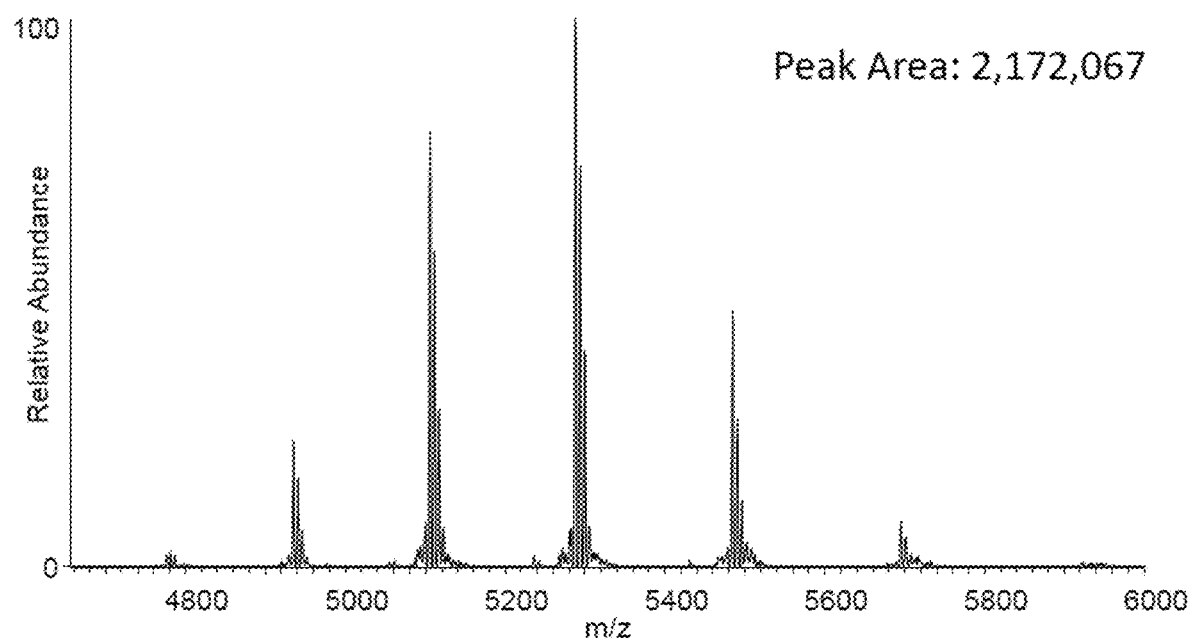
FIG. 17 is a graph showing data related to a sample processed by the molecular filtration device and transferred directly to a mass spectrometer, wherein the sample is 500 ng.
Figure 18:
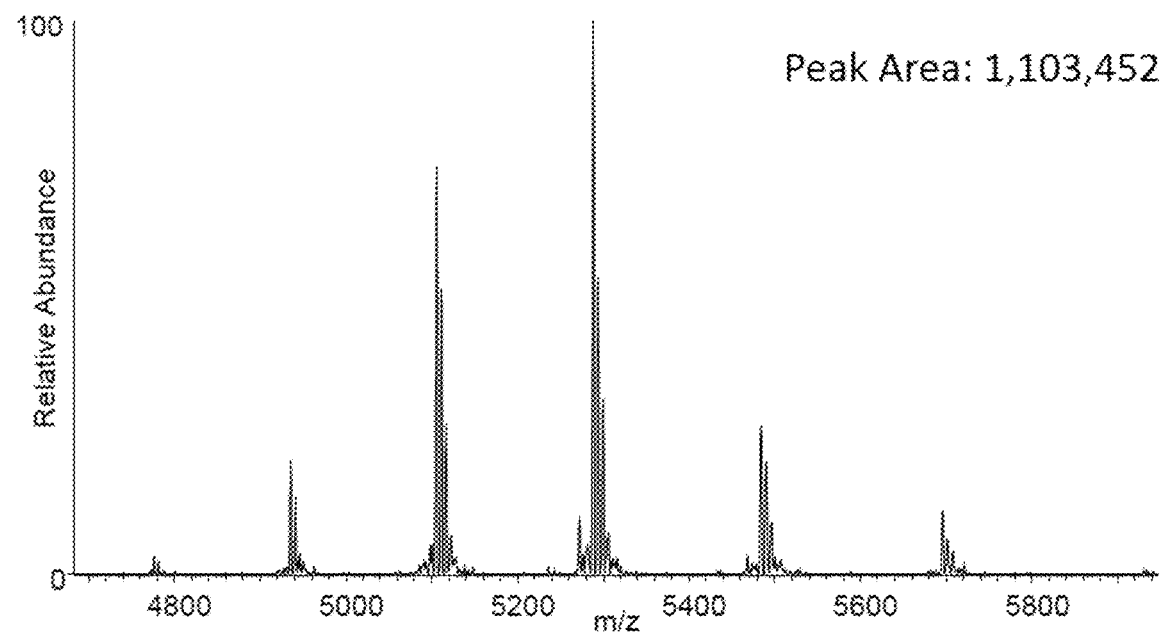
FIG. 18 is a graph showing data related to a sample processed by the molecular filtration device and transferred directly to a mass spectrometer, wherein the sample is 250 ng.

A sample of Herceptin in excipient was loaded onto a molecular filtration device and analyzed by a Q Exactive™ Plus mass spectrometer. A volume of 5 uL containing 250 ng or 500 ng of sample was loaded onto the molecular filtration device, was washed for 30 seconds with 300 uL, and eluted with 55 uL at a rate of 100 uL/min. The sample was eluted directly onto a mass spectrometer with 30 a.u. sheath; 10 a.u. aux; 300 C HESI probe; 275 C ion transfer tube; 100 V SID; 10 V HCD; Pressure reg setting: 4; 5 uscans; and 17,500 res @ m/z 200. The result of loading 500 ng is shown in FIG. 17 and the result of loading 250 ng is shown in FIG. 18.

The ratio of the peaks loaded is 0.508, which indicates a quantitative response and provided superior data to traditional methods of analysis. Further, the nature of the loading and washing of sample on the molecular filtration device allows for the ability for the user to change between denatured and native forms from run to run by specifying a different solvent, wherein up to five (5) different solvents may be connected to the system at any given time.

Experiment 9: Reverse Flow Elution v. Cross Flow Elution

Figure 19:
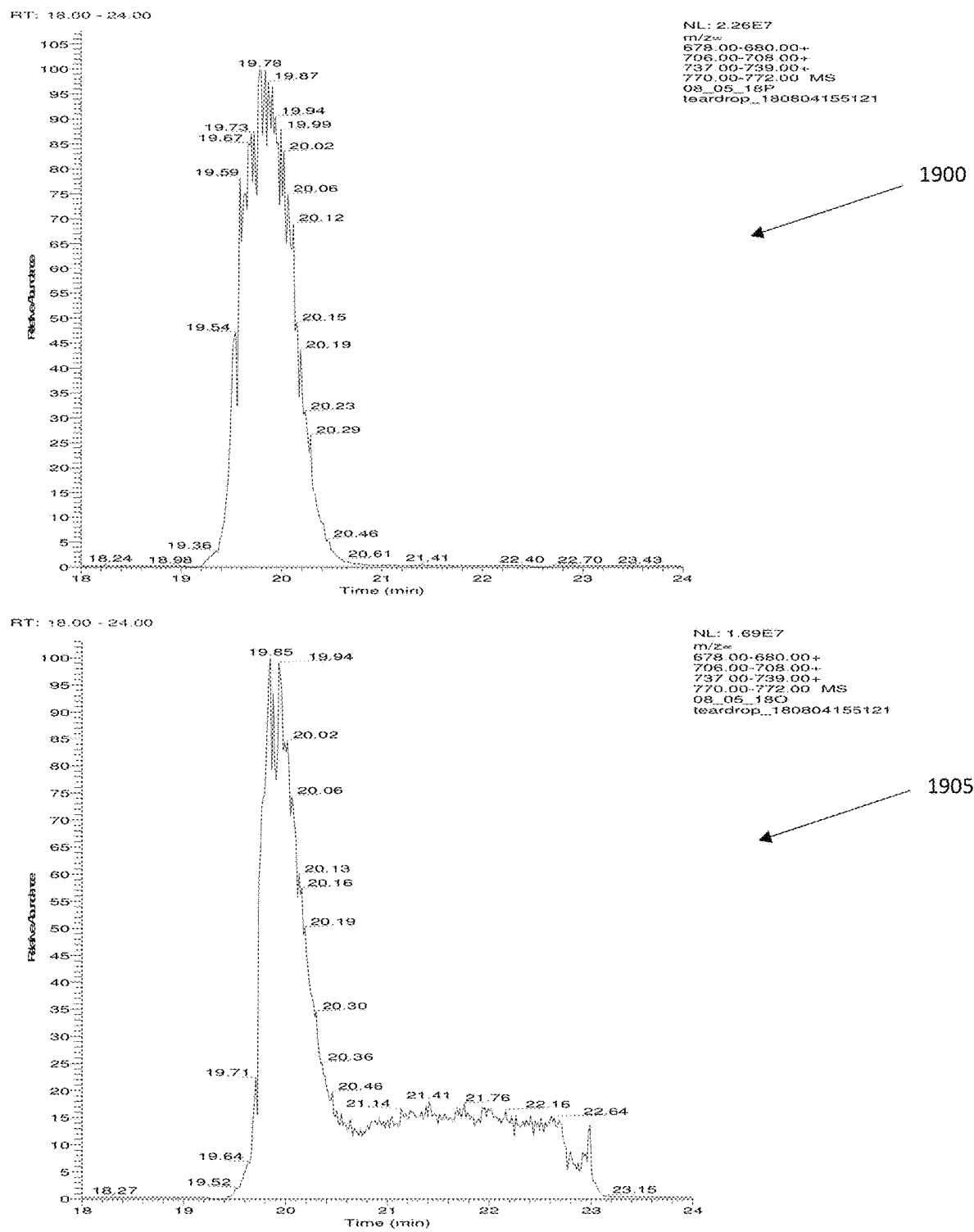
FIG. 19 is a set of graphs showing the increased efficacy of reverse flow elution as compared to cross flow elution.

A comparison was made between elution completed by reverse flow elution and cross flow elution while utilizing the molecular filtration device. The result of this elution comparison is shown in FIG. 19. As shown in FIG. 19, reverse flow elution creates a single sharp peak 1900, and cross flow elution creates a sharp peak followed by a tail end 1905. Both methods were performed using the same samples, solutions, pressures, and other conditions, and the only difference was the elution method. Specifically, reverse flow elution is conducted by preventing flow through a first upper port of the molecular filtration device and reversing flow of solution through a lower port of the molecular filtration device such that the sample is eluted out of the channel via the second upper port. The cross flow elution means that flow is prevented from passing through the lower port of the molecular filtration device, such that the sample is eluted through the second upper port.

The foregoing description of the preferred embodiment has been presented for the purposes of illustration and description. While multiple embodiments are disclosed, still other embodiments will become apparent to those skilled in the art from the above detailed description. These embodiments are capable of modifications in various obvious aspects, all without departing from the spirit and scope of protection. Accordingly, the detailed description is to be regarded as illustrative in nature and not restrictive. Also, although not explicitly recited, one or more embodiments may be practiced in combination or conjunction with one another. Furthermore, the reference or non-reference to a particular embodiment shall not be interpreted to limit the scope of protection. It is intended that the scope of protection not be limited by this detailed description, but by the claims and the equivalents to the claims that are appended hereto.

Except as stated immediately above, nothing that has been stated or illustrated is intended or should be interpreted to cause a dedication of any component, step, feature, object, benefit, advantage, or equivalent, to the public, regardless of whether it is or is not recited in the claims.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those of ordinary skill in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A molecular filtration device comprising:
   an upper portion; and
   a lower portion;
   wherein said upper portion comprises two upper ports;
   wherein said two upper ports comprise a first upper port and a second upper port;
   wherein said first upper port is configured to receive a first upper flow device;
   wherein said second upper port is configured to receive a second upper flow device;
   wherein said first upper flow device is configured to alternate between injecting and not injecting a solution;
   wherein said second upper flow device is configured to alternate between injecting and withdrawing the solution;
   wherein said lower portion comprises a lower port and a reservoir;
   wherein said lower port is configured to receive a lower flow device;
   wherein said lower flow device is configured to alternate between injecting and withdrawing the solution from said reservoir;
   wherein said upper portion comprises a channel forming lip;
   wherein a channel forming cavity is formed by said channel forming lip when said upper portion and said lower portion engage one another;
   wherein a lower sealing surface of said upper portion and an upper sealing surface of said lower portion are configured to receive and compress a membrane;
   wherein said membrane is configured to extend beyond an outer edge of said channel forming lip, wherein a portion of said membrane that is located within an inner edge of said channel forming lip is not compressed;
   wherein a channel is defined by said channel forming cavity and said membrane.

2. The molecular filtration device of claim 1, wherein said membrane is a filtration membrane.

3. The molecular filtration device of claim 2, wherein said filtration membrane is a molecular weight cut off filtration membrane.

4. The molecular filtration device of claim 1, wherein said upper sealing surface of said lower portion and said lower sealing surface of said upper portion are configured to apply a pressure to one another through said membrane.

5. The molecular filtration device of claim 1, wherein said channel has a volume of between 5 uL and 50 uL.

6. The molecular filtration device of claim 1, wherein said reservoir comprises a frit supporting lip.

7. The molecular filtration device of claim 6, wherein said device further comprises a frit; and
   wherein said frit supporting lip is configured to receive said frit.

8. The molecular filtration device of claim 7, wherein said frit comprises a porous structure.

9. The molecular filtration device of claim 7, wherein said frit is rigid.

10. The molecular filtration device of claim 1, further comprising an upper rigid support member configured to be received within the channel forming lip in order to provide structural support to an upper surface of said membrane.

11. The molecular filtration device of claim 1, wherein said channel forming cavity is teardrop shaped.

12. The molecular filtration device of claim 1, wherein said channel forming cavity is oval shaped.

13. The molecular filtration device of claim 1, wherein said channel forming cavity is elongated rectangle shaped.

14. The molecular filtration device of claim 1, wherein said upper portion and said lower portion matingly engage one another.

15. A method for automated molecular sample analysis comprising the steps;
   introducing a sample into a molecular purification system;
   wherein said sample comprises at least one type of molecule to be isolated;
   wherein said molecular purification system comprises one or more molecular filtration devices;
   wherein said one or more molecular filtration devices comprise an upper portion and
   a lower portion;
   wherein said upper portion comprises two upper ports;
   wherein said two upper ports comprise a first upper port and a second upper port;
   wherein said first upper port is configured to receive a first upper flow device;
   wherein said second upper port is configured to receive a second upper flow device;
   wherein said first upper flow device is configured to alternate between injecting and not injecting a solution;
   wherein said second upper flow device is configured to alternate between injecting and withdrawing the solution;
   wherein said lower portion comprises a lower port and a reservoir;
   wherein said lower port is configured to receive a lower flow device;
   wherein said lower flow device is configured to alternate between injecting and withdrawing the solution from said reservoir;
   wherein said upper portion comprises a channel forming lip;
   wherein a channel forming cavity is formed by said channel forming lip when said upper portion and said lower portion engage one another;
   wherein a lower sealing surface of said upper portion and an upper sealing surface of said lower portion are configured to receive and compress a membrane;
   wherein said membrane is configured to extend beyond an outer edge of said channel forming lip, wherein a portion of said membrane that is located within an inner edge of said channel forming lip is not compressed;
   wherein a channel is defined by said channel forming cavity and said membrane;
   wherein said sample is loaded into said one or more molecular filtration devices.

16. The method for automated molecular sample analysis of claim 15, further comprising the step:
   purifying said sample by washing said sample while loaded on said one or more molecular filtration devices.

17. The method for automated molecular sample analysis of claim 16, further comprising the step:
   eluting said sample from said one or more molecular filtration devices;
   wherein said sample is eluted by preventing flow of said solution through one of said two upper ports and reversing the flow direction of solution through the other upper port and lower port.

18. The method for automated molecular sample analysis of claim 17, wherein said eluted sample is eluted to an analysis machine; and
   wherein said analysis machine is in fluid communication with said one or more molecular filtration devices.

19. The method for automated molecular sample analysis of claim 17, wherein said steps of loading of said sample, purifying said sample, and eluting said sample on said one or more molecular filtration devices are conducted in parallel with respect to the one or more molecular filtration devices.

20. A molecular filtration device comprising:
   an upper portion; and
   a lower portion;
   wherein said upper portion comprises two upper ports;
   wherein said two upper ports comprise a first upper port and a second upper port;
   wherein said first upper port is configured to receive a first upper flow device;
   wherein said second upper port is configured to receive a second upper flow device;
   wherein said first upper flow device is configured to alternate between injecting and not injecting a solution;
   wherein said second upper flow device is configured to alternate between injecting and withdrawing the solution;
   wherein said lower portion comprises a lower port and a reservoir;
   wherein said lower port is configured to receive a lower flow device;
   wherein said lower flow device is configured to alternate between injecting and withdrawing the solution from said reservoir;
   wherein said upper portion comprises a channel forming lip;
   wherein a channel forming cavity is formed by said channel forming lip when said upper portion and said lower portion matingly engage one another;
   wherein a lower sealing surface of said upper portion and an upper sealing surface of said lower portion are configured to receive and compress a membrane;
   wherein said membrane is configured to extend beyond an outer edge of said channel forming lip, wherein a portion of said membrane that is located within an inner edge of said channel forming lip is not compressed;
   wherein a channel is defined by said channel forming cavity and said membrane;
   wherein said filtration membrane is a molecular weight cut off filtration membrane;
   wherein said upper sealing surface of said lower portion and said lower sealing surface of said upper portion are configured to apply a pressure to one another through said membrane;
   wherein said channel has a volume of between 5 uL and 50 uL;

wherein said reservoir comprises a frit supporting lip;
wherein said device further comprises a frit;
wherein said frit supporting lip is configured to receive said frit;
wherein said frit comprises a porous structure; and
wherein said frit is rigid.

* * * * *